United States Patent [19]

Chao

[11] Patent Number: 5,111,295
[45] Date of Patent: May 5, 1992

[54] METHOD AND SYSTEM FOR HIGH DEFINITION COLOR TV COMPATIBLE WITH EXISTING TV SETS, EXISTING BROADCASTING CHANNELS AND EXISTING VCR EQUIPMENT

[76] Inventor: Lee M. Chao, 21 Barmore St., Stamford, Conn. 06905

[21] Appl. No.: 511,569

[22] Filed: Apr. 20, 1990

[51] Int. Cl.⁵ .................. H04N 7/01; H04N 7/04; H04N 11/06; H04N 11/20
[52] U.S. Cl. ..................................... 358/140; 358/11; 358/12; 358/138; 358/141
[58] Field of Search .................. 358/11, 12, 140, 141, 358/138, 133

[56] References Cited

U.S. PATENT DOCUMENTS

| | | | |
|---|---|---|---|
| 3,909,839 | 9/1975 | Inaba et al. | 358/324 |
| 4,866,519 | 9/1989 | Lucas et al. | 358/140 |
| 4,868,654 | 9/1989 | Juri et al. | 358/138 |
| 4,884,138 | 11/1989 | Storey | 358/138 |
| 4,897,722 | 1/1990 | Flory | 358/141 |
| 4,974,079 | 11/1990 | Emori | 358/138 |

Primary Examiner—John K. Peng
Attorney, Agent, or Firm—Parmelee, Bollinger & Bramblett

[57] ABSTRACT

This high definition TV method and system are compatible with existing TV sets, existing TV broadcast channels and existing VCRS. Each standard-size picture element in a standard NTSC color television luminance signal is split into two ("Alternate Sampled Luminance" or "ASL") smaller high resolution (HR) picture elements. These two HR elements form a group, and are labeled 'A' and 'B' according to their relative positions in the group. Positive-going and negative-going pulses in a square-wave sampling control signal serve to control sampling for obtaining HR elements. HR elements having the same label are sampled in the same frame scanning period and then are used to represent the whole of each group in that frame. HR picture elements are sampled one label at a time and are transmitted in consecutive frames. Thus, all 'A' HR elements are transmitted in Frame "A"; all 'B' HR elements are transmitted in Frame "B". Frames "A" and "B" alternate with each other. A burst signal one-half fundamental frequency of the sampling control signal is inserted for synchronization into the blanking period of field one in each frame sequence. The resulting luminance signal advantageously is directly compatible with standard NTSC signals. The sampling control system is regenerated in a TV receiver decoder for sampling the incoming ASL-coded luminance signal. The samples are stored in memory. Alternate retrieval of picture elements from memory and incoming signal (or from composed data storage from two successive Frames) thereby provides a High Resolution luminance signal.

50 Claims, 3 Drawing Sheets

METHOD AND SYSTEM FOR HIGH DEFINITION COLOR TV COMPATIBLE WITH EXISTING TV SETS, EXISTING BROADCASTING CHANNELS AND EXISTING VCR EQUIPMENT

FIELD OF THE INVENTION

The invention is in the field of color television which is widely used to transmit and to record motion pictures. The invention provides a method and system in which the bandwidth of the video signal is effectively compressed prior to transmission while still retaining compatibility with the standard NTSC color video signal format. With a decoder in the TV receiver in accordance with the invention the bandwidth of the signal is effectively expanded to recover the detail contained in the compressed video signal. Thus, advantageously, the new composite video format produced by this invention provides a video signal which is compatible with all of the existing color television broadcast channels and equipment and existing TV receivers and VCR sets, while new TV receivers equipped with a decoder as described will deliver about twice as many high resolution (HR) picture elements in the scanning direction for producing correspondingly enhanced (higher) definition in the resultant TV picture being seen.

The term "in the scanning direction" means in the direction of scanning for producing the picture on the TV picture screen. This scanning direction is usually horizontal, but in some instances this direction of scanning may be vertical or at some direction between horizontal and vertical.

BACKGROUND

Since the NTSC (National Television System Committee) color television video signal format was adopted in the early 1950's, there has been little change to it. Along with advancement of technology, the resolution or the clearness of the picture delivered by a color television receiver set has become higher and higher. With the introduction of the comb filter, a modern color television receiver can effectively separate the chroma component from the luminance signal without losing the high frequency details of the picture.

However, due to the 4.2 MHz limitation of the NTSC video bandwidth, about 350 lines of resolution in the scanning direction is near the maximum that a standard NTSC color television receiver can deliver. The luminance portion of the NTSC signal is the key factor in determining the resolution in the scanning direction of the reproduced picture. The more picture elements contained in the luminance signal, the higher becomes the resolution in the scanning direction, but the wider becomes the bandwidth required to transmit such a luminance signal.

In a standard home video cassette recorder (VCR), the luminance signal is recorded separately from the chroma signal. But the frequency difference between the luminance recording carrier and the chroma recording carrier is not large enough to provide much more than about 3 MHz bandwidth for the luminance signal. Therefore, the resolution of a video signal reproduced by such a VCR is restricted or limited to about 240 lines of resolution in the scanning direction.

Attempts or proposals have been made to overcome the resolution limits imposed by the standard NTSC video bandwidth so as to meet the demand that a higher resolution, clearer color picture be provided from color television receivers and VCR's, since modern TV receivers and VCR's have now approached their theoretical performance limits. Unfortunately, all of those attempts or proposals to date of which I am aware share the same fatal shortcoming of not being compatible with the existing NTSC standard signal bandwidth or its format, and thus they would entail the obsolescence of a vast existing amount of conventional TV equipment now in the hands of the American public.

In other words, all those attempts or proposals to overcome resolution limits imposed by the NTSC color TV video signal format would overcome the inherent bandwidth limitation problems by changing the rules of the game, thereby making all existing TV sets obsolete. Some of those attempts or proposals will now be discussed briefly.

The super VHS format VCR moves the luminance recording carrier to a higher frequency, thus obtaining wider bandwidth for the luminance signal, while there is no change to the chroma signal. Furthermore, there is required a new video connector (S connector) in which the luminance signal and the chroma signal are separately transmitted so as to bypass the limit of the standard NTSC composite format, thereby enabling a color television monitor to produce a clearer picture from a video cassette. By combining these methods, super VHS is claimed to provide 425 lines of resolution in the scanning direction, which indeed is significantly higher than the 350 lines that the standard NTSC broadcast video signal can deliver.

But, super VHS entails some serious technological trade-offs. Due to the use of a higher luminance recording carrier frequency, a new kind of recording tape has to be used to record in this new super VHS format. A more serious technological penalty is that the tape recorded in the new format can not be played on a standard VCR. It is true that by using a compatible mode, a super VHS VCR can play today's standard tapes, but a new super VHS format tape will not play in today's standard VCR. Another technological penalty is tat the resolution of the picture will suffer if the output from such a new format tape is not taken from the S connector but is taken from the standard NTSC composite video output.

Some high definition television systems have been demonstrated. Such suggested new systems simply employ a wider video bandwidth to accommodate the increased picture element rate and increased number of scanning lines. Such new systems double the resolution both in the horizontal and vertical directions, but the resultant video formats are totally incompatible with the current NTSC standard. The technological penalty is that all of the existing video equipment, existing receivers and existing tape libraries would become obsolete and would need to be replaced at an enormous cost.

There is a frame differential television method which only transmits the difference between adjacent frames of a motion picture. A frame memory in the TV receiver stores the whole image of the last frame. Then, the circuits receive and update only those particular picture elements which are different from corresponding elements in the last frame. Due to the fact that successive frames of a TV motion picture will mostly look alike, the information transmitted per frame for updating each successive frame is reduced as compared with transmitting a whole new frame. But a standard NTSC receiver can not reproduce any picture from those frame differential TV method signals. Therefore, no compatibility with the existing NTSC standard would be provided by the frame differential TV method.

In summary, all of the prior art attempts or proposals now known to me to be seeking to increase the resolution of color television reception suffer from serious compatibility problems. Though these prior art proposals do provide various degrees of improvement in resolution over the current NTSC standard, none of them may coexist and share existing TV or VCR equipment with the current standard.

SUMMARY OF THE DISCLOSURE

Current standard NTSC composite video format limits the video bandwidth to about 4.2 MHz, which restricts the maximum resolution in the scanning direction (usually horizontal) of the color television receiver to an upper limit of about 350 lines. A preferred system embodying the invention will provide a TV color picture with about 700 lines of resolution in the scanning direction (effectively about double the 350 lines of resolution currently available in the scanning direction from conventional NTSC color TV broadcasting).

The present invention provides complete compatibility with the current NTSC composite video standard and thereby advantageously allows a conventional standard color television receiver to produce pictures with standard resolution from the new format of this invention, but new color television receivers embodying this invention will produce pictures with high resolution from broadcast TV signals coded with the ASL format. The invention also enables the new high resolution video signals to be edited, transmitted, and broadcast through the existing equipment without any alteration of the existing equipment.

A VCR unit embodying this invention records video signals with twice the resolution (480 lines) in the scanning direction as compared with the 240 lines now available from a standard VCR. This VCR horizontal of 480 lines is higher than the 425 lines claimed for super VHS. Moreover, the recorded tapes are directly exchangeable with and are directly playable in standard VCR's. This complete compatibility with existing VCR equipment provided by the present invention has tremendous advantages in producing, exchanging, distributing and renting of prerecorded video programs.

The color pictures produced by employing this invention have higher signal-to-noise ratio as compared to directly transmitting or recording the luminance signal in a wider bandwidth so as to achieve the same amount of enhanced resolution. A wider bandwidth as called for by some of the proposals discussed above in the BACKGROUND will cause the resulting wider-bandwidth amplifiers (RF, IF, video) in the luminance signal path to have higher noise figures (lower signal-to-noise ratio) than their present-day NTSC compatible narrower-bandwidth counterparts. Hence the completely compatible method and system embodying this present invention make the pictures reproduced cleaner and clearer, due to providing higher signal-to-noise ratio than those which would be produced by directly transmitting or recording with any proposed wider (non-NTSC-compatible) bandwidth.

One of the aspects and features of the present invention is that a method is provided for converting the standard luminance signal into an NTSC-compatible-compressed-format with high resolution by employing a novel encoder located at the broadcasting station and then in a TV receiver to expand the signal to recover the high resolution by employing a novel decoder. By virtue of the fact that both positive-going and negative-going waves of a sampling control signal are employed to control the decoder, twice the resolution is achieved without exceeding the NTSC-compatible bandwidth.

In accordance with the invention, each "standard" picture element in each scanning line is divided into two high resolution (HR) picture elements. In the "Alternate Sampled Luminance" (ASL) method embodying the invention, the number of "standard" picture elements on each scanning line is selected in such a way that the maximum fundamental frequency of the video signal resulting from scanning these "standard" picture elements has a preferred value equal to about the very highest harmonic of the horizontal scanning frequency within the permissible video bandwidth of the standard NTSC color TV format. Each standard picture element in the ASL method is divided in half into two smaller HR elements, and the resulting two HR elements are labeled 'A' and 'B'. Thus, a scanning line becomes comprised of high resolution (HR) picture elements successively labeled 'A', 'B', 'A', 'B', 'A', 'B', and so forth.

An HR picture element labeled 'A' together with the very next HR picture element labeled 'B' form a picture element "group" equal in size to the smallest distinguishable "standard" NTSC-compatible picture element. When scanning the lines in a first frame (Frame "A") only HR picture elements labeled 'A' are sampled, and their luminance outputs are used in each respective group in Frame "A" to substitute for the nonexistent outputs from the non-sampled alternate HR picture elements labeled 'B' in each respective group. In other words, it is assumed in accord with this invention that the luminance of each non-sampled 'B' HR picture element in each group is the same as the luminance of the sampled 'A' HR picture element in that group.

Similarly, when scanning the lines in a second frame (Frame "B") only HR picture elements labeled 'B' are sampled, and their luminance outputs are used in each respective group in Frame "B" to substitute for the nonexistent outputs from the non-sampled alternate HR picture elements labeled 'A' in each respective group. In other words, it is conversely assumed that the luminance of each non-sampled 'A' HR picture element in each group is the same as the luminance of the sampled 'B' HR picture element in that group.

A short duration of a sync signal is inserted into the vertical blanking period immediately prior to field one in Frame "A". The frequency of this sync signal is one-half of the fundamental frequency of the sampling control signal. By employing this ASL method, the effective number of picture elements in the scanning direction is doubled without increasing the bandwidth, and thus resolution in the scanning direction is effectively doubled while remaining within the bandwidth now available under the now-existing NTSC standards.

Keeping in mind that each frame of a conventional TV-picture comprises "field one" which includes lines 1, 3, 5, 7, 9, etc. of the frame subsequently interlaced with "field two" which includes lines 2, 4, 6, 8, 10, etc. of the frame, the ASL method of this invention can be described in another way, namely: During Frame "A" (including both field one and field two of Frame "A") the first half of each standard-size picture element is sampled, as a High Resolution element, and the luminance signals resulting from sampling those first-half standard-size picture elements are used during transmission of TV-pictures to represent the luminance for the whole of the standard-size picture elements. Then, during Frame "B" (including both field one and field two of Frame "B") the second-half of each standard-size picture element is sampled as a High Resolution element, and the luminance signals resulting from sampling those second-half standard-size picture elements are used during transmission of the TV-pictures to represent the luminance for the whole of the standard-size picture elements. Thus, the advantageous result is to double the resultant resolution in the scanning direction (usually a horizontal scanning direction) while meeting all of the existing standard NTSC protocols for color television broadcasting in the United States. If rapid motion happens to be depicted in some portion of a TV-picture, then double resolution in that rapid-motion region of the picture will not be obtained, but that minor lack of double resolution is not a significant drawback, since the eyes of most human beings merely "see" (or "follow") rapid motion in real life as being blurred images. Moreover, an optional fast-motion-image compensation circuit may be provided in accord with this invention, if desired, for substituting the luminance of currently incoming High Resolution picture elements in those regions of the picture depicting rapid motion so that these rapid-motion regions are currently more-quickly updated t provide a clearer image.

BRIEF DESCRIPTION OF THE DRAWINGS

The invention together with further objects, aspects, advantages and features thereof will be more clearly understood from a consideration of the following description taken in conjunction with the accompanying drawings in which like elements and wave forms will bear the same reference designations throughout the various FIGURES.

In FIG. 5 there is two-frame storage capability. for storing the composed data from two successive Frames of a color TV motion picture.

DETAILED DESCRIPTION OF PREFERRED EMBODIMENTS

Figure 1:
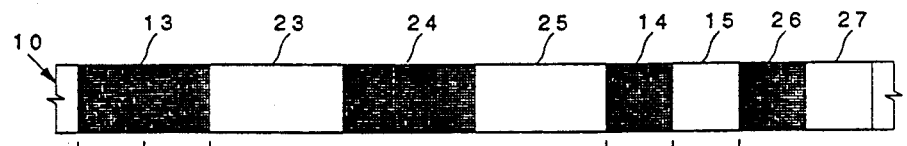
FIGS. 1A through 1H illustrate images of portions of patterns in the scanning direction (here shown as horizontal) and also show the electrical wave forms in a system embodying the "Alternate Sampled Luminance" or "ASL" coding method of the present invention.
Figure 1:
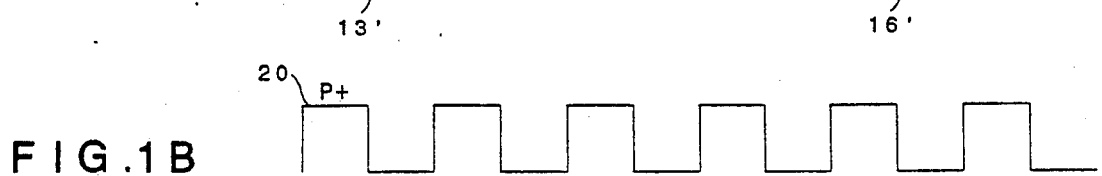
Figure 1:
Figure 1:
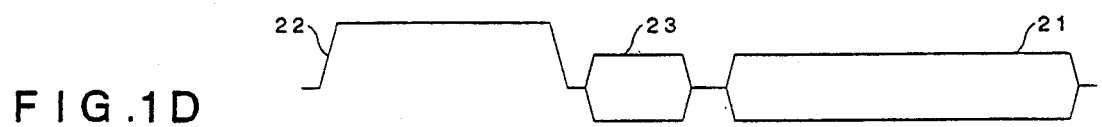
Figure 1:
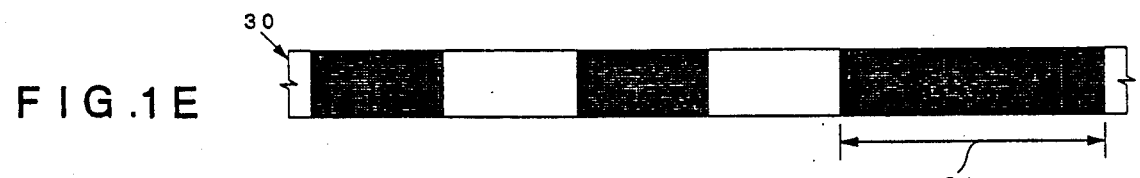
Figure 1:
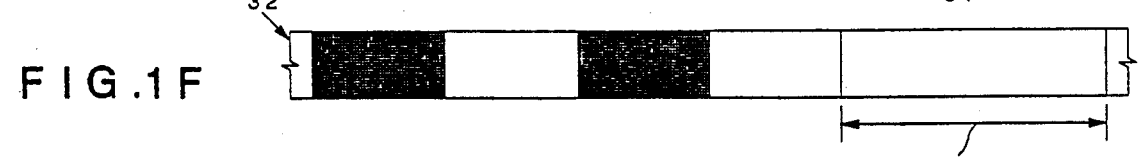
Figure 1:
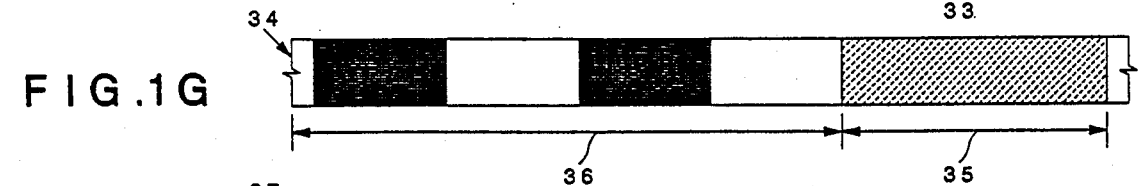
Figure 1:
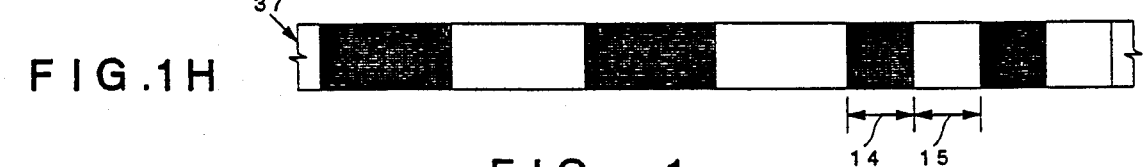

A part of a horizontal scanning line 10 (FIG. 1A) of a television picture is illustratively shown as a checkerboard pattern. The larger rectangular pattern 13 at the left side having the horizontal dimension 13' represents the smallest "standard" picture element distinguishable in the permissible luminance bandwidth of the standard NTSC color TV format. The smaller patterns 14, 15 near the right side have respective horizontal (scanning-direction) dimensions 14' and 15' which are one-half of picture element 13. It is to be understood that the more distinguishable picture elements tat are provided on a horizontal scanning line 10, the higher will be the resultant resolution of the TV picture in the horizontal scanning direction.

The present invention also is applicable to TV-type pictures wherein the direction of scanning is vertical and the blanking period involves a horizontal blanking period direction. Thus the term "horizontal" as applied to the scanning direction is not intended as a limitation but rather as being illustrative of the scanning arrangement usually encountered in today's commercially available TV-sets and is intended to be interpreted sufficiently broadly to include vertical scanning arrangements. Similarly, the term "vertical blanking period" is intended to be interpreted sufficiently broadly to include a horizontal blanking period in a vertical scanning arrangement.

Each Standard-Size Picture Element Is Sub-Divided Into Two High-Resolution (HR) Picture Elements In accordance with the Alternate Sampled Luminance (ASL) method of the present invention, a scan line 10 is partitioned in the scanning direction into twice the conventional number of new smaller picture elements each of the same scanning-direction size 14' as picture element 14. Thus, the conventional (also called "standard") picture element 13 is now to be sub-divided into two adjacent smaller high resolution (HR) picture elements having the respective horizontal (scanning-direction) dimensions 11' and 12'. Similarly, the two adjacent smaller HR picture elements 14 and 15 have the respective scanning-direction dimensions 14' and 15', as mentioned above. The first picture element of each such pair of adjacent smaller HR picture elements is denoted by the letter or label 'A', and the second picture element of each such pair is denoted by the letter or label 'B'.

Each pair of two HR picture elements 'A' & 'B' is considered to comprise "a group". By definition, each such 'A' & 'B' group has a scanning-direction size, for example as indicated at 16' which is equal to the size 13' of the smallest "standard" picture element 13 distinguishable under now-existing NTSC color TV standards.

The First HR Picture Element of Each Group Is Transmitted In a First Frame ("A"), and The Second HR Picture Element of Each Group Is Transmitted In a Second Frame ("B")

As will be explained in further detail later, each HR picture element which is labeled 'A' is transmitted in a first picture frame, called Frame "A". Each HR picture element labeled 'B' is transmitted in a second picture frame called Frame "B". Thus, the transmitted picture frames alternate as Frame "A", Frame "B", Frame "A", Frame "B", and so forth just as the high resolution (HR) picture elements alternate 'A', 'B', 'A', 'B', and so forth, along each horizontal scan line 10.

Alternative Sampled Luminance Command Pulses (Square-Wave Sampling Control Signal)

In FIG. 1B is shown a square-wave sampling control signal 20 of which the respective positive-going and negative-going pulses P+ and P− serve as command pulses in the ASL sampling control method employed in accordance with this invention. The function of this ASL sampling control signal 20, and the manner in which this sampling control signal is advantageously derived from the conventional horizontal scan sweep frequency of a standard NTSC color television broadcast signal will be explained in detail later. In accord with the invention the fundamental frequency of this ASL sampling control signal 20 is selected to be twice the value of about the highest harmonic of the horizontal scanning frequency permitted by the available video bandwidth.

The cycle time of this ASL sampling control signal 20 is equal to the standard picture element period (the time required to scan across the picture elements having a horizontal dimension shown as 13' and 16' in FIG. 1A). A sampling circuit 41 (FIG. 2) only samples the incoming luminance signal 40 (FIG. 2) in P+ periods during Frame "A" or in P− periods during Frame "B". Thus, there is only one sample produced per sampling cycle. Each standard-size picture element 13, 23, 24 or 25 is sampled once per frame period.

The maximum fundamental frequency in the sampled (ASL-coded) luminance signal output 46 (FIG. 2) results when the samples happen to be alternately white and black. That is, this maximum fundamental frequency occurs when the first sample is white, the second sample is black, the 3rd, 5th, 7th . . . samples are white, etc. and the 4th, 6th, 8th . . . samples are black, etc. In this maximum fundamental frequency case, each pair of white and black samples makes up a cycle, with the high amplitude luminance output from the white sample being the positive half cycle and the low amplitude luminance output from the black sample being the negative half cycle. Due to the fact that there is one sample produced per full cycle of the sampling control signal 20, the minimum full cycle time of the sampled luminance output 46 (FIG. 2) is twice the length of time for a sample cycle to occur as controlled by the sampling control signal 20. In other words, the maximum fundamental frequency (Fmax-selected) contained in the sampled luminance output signal 46 is half the effective frequency of action of the sampling control signal 20, and this maximum fundamental frequency Fmax-selected is selected in accord with the invention to be equal to the value of about the highest harmonic of the horizontal scanning frequency permitted by the available luminance bandwidth.

The duration of periods P+ and P− in the sampling control signal 20 is equal. During Frame "A", the sampling circuit 41 (FIG. 2) takes samples from the incoming luminance signal 40 (FIG. 2) in P+ periods. During Frame "B", the sampling circuit 41 takes samples from the incoming luminance signal 40 in P− periods. The P+ periods are the same periods during which the HR picture elements labeled 'A' are scanned. Similarly, P− periods are the periods during which the HR picture elements labeled 'B' are scanned.

The selection of the frequency for the sampling control signal 20 varies from application to application, e.g., TV broadcasting applications, VCR applications, TV games applications, TV monitoring or surveillance applications, etc., each of which may have different limitations on the available luminance signal bandwidth. It is to be understood that the higher the frequency of the sampling control signal 20, the more HR picture elements being sampled and contained in the ASL-coded luminance signal 46, the higher maximum fundamental frequency Fmax contained in the ASL-coded luminance output signal 47, the higher the resolution in the scanning direction to be obtained from the luminance signal when it is decoded, as explained later, and the wider the bandwidth needed to transmit such an encoded output signal 47 without losing the smaller samples. By virtue of employing a frequency for the sampling control signal 20 equal to twice a harmonic of the horizontal scanning frequency, this invention enables the maximum fundamental frequency (Fmax-selected) contained in the ASL-coded luminance output signal 47 to be selected to be equal to about the highest permitted harmonic of the horizontal scanning frequency as explained above. This advantageous choice of frequency for the sampling control signal 20 makes the ASL-coded luminance output signal 47 share the same spectrum properties as the normal luminance signal 40.

The highest permissible harmonic of the horizontal scanning frequency for NTSC standard color TV broadcasting with a maximum luminance bandwidth of 4.2 MHz is the 266th, which is at a frequency of 4.1853 MHz. In the NTSC standard color TV there are 29.97 frames (59.94 fields) per second with 525 lines per frame, and thus the scan frequency is 15,734.25 Hz. Multiplying 266 times this scan frequency gives the above value of 4.1853 MHz. Multiplying 267 times this scan frequency gives a value of 4.2010 MHz, which is seen to exceed 4.2 MHz.

It is a discovery by others that the energy of the normal luminance signal 40 is concentrated on the harmonics of horizontal scanning frequency and thus enables the use of a so-called "comb-filter" for separating a luminance signal from a chroma signal.

Examples of NTSC-Compatible Frequencies For The ASL Sampling Control Signal 20

In a standard NTSC color TV broadcast system, the horizontal scanning frequency is set to about 15734 Hz. Thus, advantageously, for example, twice the 182nd harmonic of the horizontal scanning frequency, i.e. the 364th harmonic, may be selected as the sampling frequency used to control sampling of the luminance signal so as to cause the maximum fundamental frequency (Fmax-selected) of this ASL-coded signal 47 to be at 2.863588 MHz to fit into the 3 MHz luminance bandwidth of a standard video cassette recorder (VCR). Consequently, the sampling frequency which is twice the maximum fundamental frequency (Fmax-selected) of the ASL-coded signal 47 becomes twice 2.863588 MHz, which is a frequency high enough to recover up to 5.727176 MHz of the high frequency components in the luminance signal, which is equivalent to about 480 lines of resolution in the horizontal scanning direction for a TV-picture produced from a video cassette recorder. A predetermined even harmonic of the scanning sweep frequency may be used, for example, such as the 364th, 362nd, 360th, 358th, 356th, 352nd, 350th and 348th harmonic of the sweep frequency.

For example, for color TV broadcast applications, twice the 266th harmonic of the horizontal scanning frequency, i.e. the 532nd harmonic, is 8.370488 MHz, and this frequency is selected as the sampling frequency used to sample for the standard NTSC broadcast video bandwidth of 4.2 MHz. Therefore, the maximum fundamental frequency (Fmax-selected) of the resultant ASL-coded signal 47 is 4.185244 MHz and fits within the standard NTSC color TV luminance signal bandwidth of 4.2 MHz. This sampling frequency is high enough to recover up to 8.370488 MHz of the high frequency components in the TV luminance signal, which is equivalent to about 700 lines of resolution in the horizontal scanning direction. A predetermined even harmonic of the scanning sweep frequency may be used, for example, such as the 532nd, 530th, 528th, 526th, 524th, 522nd, 520th, 518th and 516th harmonic of the sweep frequency.

Decoder Synchronizing Signal Has Wavelength Equal To Twice the Wavelength OF the Fundamental Frequency of the ASL Sampling Pulses In FIG. 1C is shown a decoder synchronizing signal wave 21 which is inserted into a particular vertical blanking period as now will be explained. As seen by comparing FIG. 1C with FIG. 1B, the wavelength of the decoder sync signal 21 is twice the wavelength of the fundamental frequency of the AS sampling control (pulse) signal 20.

Conventional Interlaced Scanning May Be Employed In Practicing This Invention

In a standard NTSC color television video format, each picture frame as seen on the screen of the TV receiver comprises two interlaced fields. The first of the two-interlaced fields may be called "field one", and the second "field two". Sometimes writers describe field one as the "odd field" and field two as the "even field", because field one involves scanning lines 1, 3, 5, 7, 9, etc. of the picture frame, and field two involves the interlaced scanning lines 2, 4, 6, 8, 10, etc. of the picture frame. A vertical blanking period occurs between each such field.

In accord with the ASL method of the present invention for enhancing horizontal resolution of each scan line, the successive picture frames, as mentioned above, are denoted Frame "A", Frame "B", Frame "A", Frame "B", Frame "A", Frame "B", and so forth. Thus Frames labelled "B" alternate with Frames labelled "A". Frames "A" may be considered to be "odd" Frames, and Frames "B" may be considered to be "even" Frames, as they alternate with each other. ("Odd" and "even" Frames are not to be confused with "odd" and "even" fields.) In compatible compliance with the existing NTSC color TV broadcast signal format, each of these "A" and "B" Frames comprises a field one interlaced with a field two.

Decoder Sync Signal Is Inserted During Vertical Blanking Period

The decoder synchronizing signal 21 (FIG. 1C) is inserted into the vertical blanking period which precedes each field one of each Frame A.

In FIG. 1D is illustrated a presently preferred manner in which this decoder sync signal 21 can be included in a standard NTSC color TV video signal. In FIG. 1D, the wave form 22 represents a conventional horizontal synchronizing pulse, which occurs during the vertical blanking period, and the reference number 28 indicates the envelope of the chroma reference signal, which also occurs during the vertical blanking period following the horizontal sync pulse 22. In accord with the present embodiment of this invention, the decoder sync signal 21 is inserted during a small portion of the vertical blanking period preceding each field one of each Frame A and is preferred to be transmitted during each such vertical blanking period following the chroma reference signal 28. Thus, in FIG 1D the reference number 21 indicates the envelope of the decoder sync signal whose waveform is shown by the reference 21 in FIG. 1C.

Encoder

Figure 2:
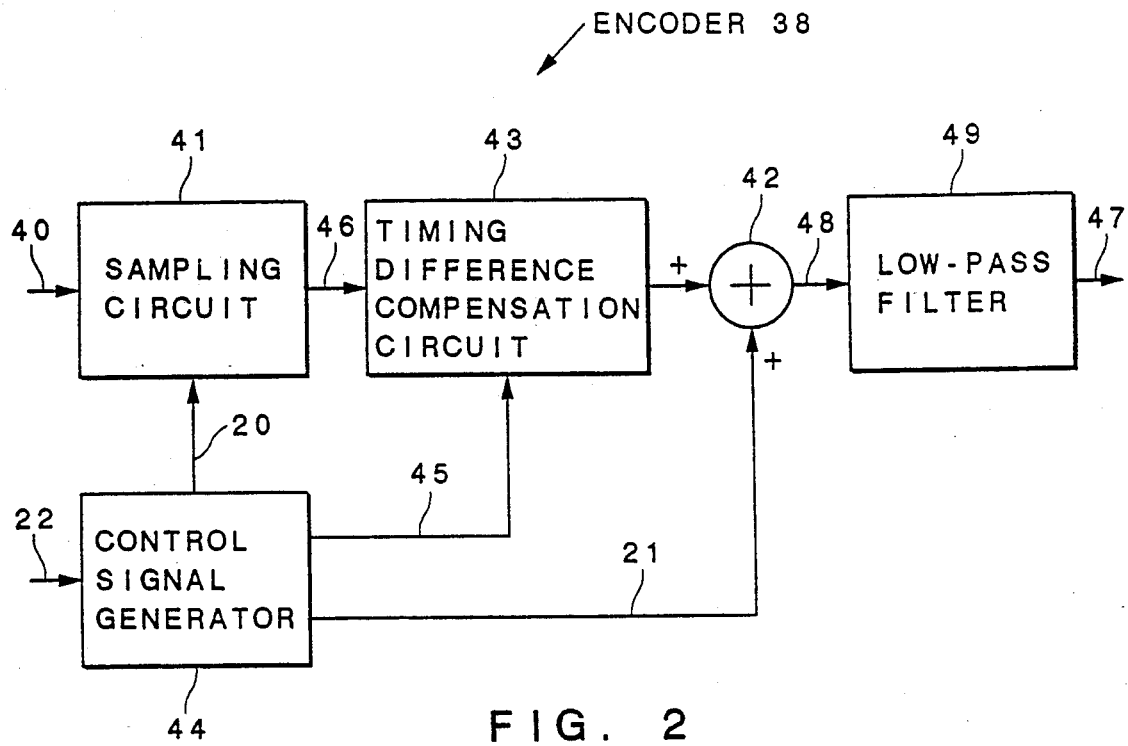
FIG. 2 is a functional block diagram of an encoder embodying this invention for generating an ASL-coded luminance signal for use in television broadcasting of a color motion picture by conventional existing TV broadcast equipment.

In an encoder shown in FIG. 2 generally indicated at 38, a conventional luminance signal being fed into the encoder at 40 is converted to the format called Alternate Sampled Luminance (ASL) provided from the output 47. In other words, from the output 47 is provided the ASL-coded luminance signal. A sample circuit 41 samples the conventional incoming luminance signal fed in at 40. This sampling, as indicated by the arrow 20 in FIG. 2, is under control of the command of pulses from the square-wave ASL sampling control signal 20 (FIG. 1B). For example, the sampling frequency of this sampling control signal 20 is preferred to be twice the highest harmonic of the scanning sweep frequency permitted by the available luminance bandwidth. (It is to be understood that the higher the sampling frequency, the higher the frequency components in the luminance signal that can be coded and recovered later.)

As explained above in accord with the present ASL format, the highest fundamental frequency (Fmax-selected) contained in the ASL-coded signal 47 equals one-half of the fundamental frequency of the sampling control signal 20, and consequently this fundamental frequency is able to reach a decoder 39 (FIG. 3) within the permitted bandwidth and thereby enables recovery of the original luminance signal.

In the encoder 38 (FIG. 2) there is a phase locked loop timing pulse generator circuit (PLL) circuit 44 for generating the ASL sampling pulses of the square wave sampling control signal 20 in exact frequency and phase from the conventional standard (horizontal) scanning sync pulse 22.

ASL-Coded Luminance Signal Can Be Separated By Conventional Comb Filter In Today's TV Sets and VCR's Just Like A Standard Luminance Signal Since the fundamental frequency of the ASL sampling control signal 20 is advantageously selected to be an even harmonic of the horizontal scanning frequency, the frequency spectrum of the resultant ASL signal at the output 47 is also concentrated on (aligned with) harmonics of the horizontal scan frequency. Therefore, the spectrum of this Alternate Sampled Luminance coded signal 47 is consistent with the spectrum of the original incoming standard conventional luminance signal 40. Consequently, this ASL-coded luminance signal 47 can be separated from the conventional chroma signal by a comb filter as widely used today in modern color television receiver sets and video cassette recorders.

Luminance Signal From Sampled HR Picture Element In Each Group Is Substituted For Non-Existent Luminance Signal For Other Non-Sampled HR Picture Element In That Group During scanning for a first frame (odd frame or Frame "A") only those high resolution (HR) picture elements labeled 'A' are sampled on P+ periods of the sampling control pulse signal 20, for example such as the first half of the element 13 (FIG. 1) or such as the element 14. Then, their luminance signals are used to substitute for the HR picture elements marked with 'B', for example such as the second half of the element 13 or such as the element 15. In scanning for the second frame (even frame or Frame "B") period only those HR picture elements labeled 'B' are sampled on P− periods of the sampling control pulse signal 20, and their luminance signals are used to substitute for the HR picture element labeled 'A'.

In the encoder 38 (FIG. 2) there is a timing compensation circuit 43 for compensating for the sampling timing difference between successive Frame "A" and Frame "B" and Frame "A", and so forth. This timing compensation circuit 43 is controlled by the PLL circuit 44, as shown by the arrow 45, representing the timing compensation control signal for controlling the timing compensation circuit 43. This timing compensation circuit 43 also extends the picture element luminance signal to include each of the whole 'A' & 'B' group periods, i.e., so as to include each of the two picture elements in each group, for example the two HR elements 14 and 15. In other words, the non-existent ("missing") luminance signals for the non-sampled HR picture elements in each group are advantageously replaced (substituted for) by the other (companion) HR picture elements in each group. By virtue of these advantageous substitutions, the output ASL-coded signal at 47 contains only signals equivalent to the "standard" larger picture elements 13 of the conventional size.

The Information For Providing Twice-Standard Resolution In The Scanning Direction Is Provided By Two Successive Frames The information for providing the horizontally enhanced (scanning-direction enhanced) high resolution (HR) small picture elements (for example, comprising the two halves of the element 13 or comprising the HR elements 14 and 15) is carried in two successive transmitted frames, i.e., in Frame "A" plus Frame "B", as will be explained.

In order to synchronize the decoder to recover the small HR picture elements for achieving enhanced horizontal resolution, a short burst of a decoder synchronizing signal wave 21 (FIG. 1C and 1D) is inserted during a small portion of the vertical blanking period prior to field one in Frame "A". As shown in FIG. 1D, this decoder sync signal 21 is transmitted following the horizontal sync pulse 22 and the subsequent chroma reference signal 28, for example being inserted by means of a summing amplifier 42 (FIG. 2).

Decoder Sync Signal Is Also The ASL Sync Signal Or ASL Reference Signal

Such decoder sync signal 21 is also called an ASL sync signal or ASL reference signal, and as discussed above, it is selected to be at a frequency of one-half of the fundamental frequency of the ASL sampling control signal 20 and is generated by the PLL circuit 44. This ASL reference signal 21 is synchronized in phase relationship with the ASL sampling control signal 20, as is shown by comparing FIG. 1C with FIG. 1B.

It is to be noted that the output signal 48 from the summing amplifier 42 is passed through a low-pass filter 49 for the purpose of removing high frequency components inherently introduced by the sampling process. The reason for removing these high frequency components is to keep the spectrum of the resultant ASL-coded signal at the output 47 within the permissible bandwidth of the application.

The Resultant NTSC Composite Signal Including This ASL-Coded Luminance Signal Can Be Broadcast By Standard Existing Color TV Broadcasting Equipment The ASL-coded output signal 47 (FIG. 2) advantageously can be used as a substitute for the regular luminance signal to form an NTSC composite video signal. The resultant composite signal then can be transmitted through a standard bandwidth of a conventional TV broadcast channel or can be recorded by a standard VCR recorder.

The Resultant NTSC Composite Signal Including This ASL-Coded Luminance Signal Will Produce The Same Viewable Image In A Conventional Standard TV Set As A Conventional NTSC Color Broadcast Of The Same Scene Without This ASL-Coded Luminance Signal The NTSC composite video signal encoded with the ASL output signal 47 will produce the same viewable image in a conventional standard TV set as a conventional NTSC TV broadcast of the same scene without the ASL-coded output signal 47.

In order to explain how a conventional standard TV set receives a broadcast involving an NTSC composite video signal encoded with the ASL-coded signal 47 (FIG. 2), it will be assumed that the scan line segment 10 of FIG. 1A is now being transmitted. For example, this scan line segment 10 is shown as including four conventional-size picture elements 13, 23, 24 and 25 followed by four smaller-size high-resolution (HR) picture elements 14, 15, 26 and 27. When the TV broadcast signal transmitting this scan line 10 including picture elements 13, 23, 24, 25, 14, 15, 26 and 27 is received and demodulated in a conventional standard TV set without a decoder 39 (FIG. 3), a scan line image 30 (FIG. 1E), is reproduced by the standard television receiver on its screen during Frame "A" in which the resulting standard-size picture elements being shown will correspond with all HR picture elements sampled in the P+ periods of the sampling control signal 20, namely, will correspond with the left halves of standard picture elements 13, 23, 24, 25 and with HR picture elements 14, 26. Image 32 (FIG. 1F) of the same scan line 10 is reproduced by this standard TV screen during Frame "B" in which the resulting standard-size picture elements being shown will correspond with all HR picture elements sampled in P− periods of sampling control signal 20, namely will correspond with the right halves of standard picture elements 13, 23, 24, 25 and with HR picture elements 15, 27. Any object of which the image size is equal to or larger than the minimum size of a conventional picture element 13 is not affected by those previously described substitutions of picture elements in the ASL-coded output signal 47 (FIG. 2). Consequently patterns 13, 23, 24 and 25 in scan line 10 are reproduced as they were by the actions of both Frame "A" and Frame "B", so these four picture elements are seen in the resulting TV picture line 34 (FIG. 1G) resulting from a summation of the scan lines 30 and 32 of Frames "A" and "B" respectively. But the 'A'-labelled high resolution (HR) small picture elements 14 and 26 which are contained in the scan line 30 of Frame "A" are absent from the scan line 32 of Frame "B". The opposite occurs for the high resolution picture elements 15 and 27. In other words, these 'B'-labelled high resolution picture elements 15 and 27 are absent from the scan line 30 of Frame "A" and are present in the scan line 32 of Frame "B". The effect of successive scan lines 30 and 32 is a scan line screen summation 34 (FIG. 1G) which causes an average of both of the portions 31 and 33 to appear in the period 35. This result as seen on the standard TV screen in the period 35 (FIG. 1G) is the same average effect as if those high resolution picture elements in the period 31 of scan line 30 and in the period 33 of scan line 32 were sent through the channel with standard bandwidth and averaged by means of a low pass filter in the video signal path, thereby producing an average grey (mid-luminance) area 35. Since a conventional color TV broadcast receiver would not be able to resolve the high resolution picture elements 14, 15, 26, 27 the result would similarly produce an average grey (mid-luminance) area 35.

Figure 3:
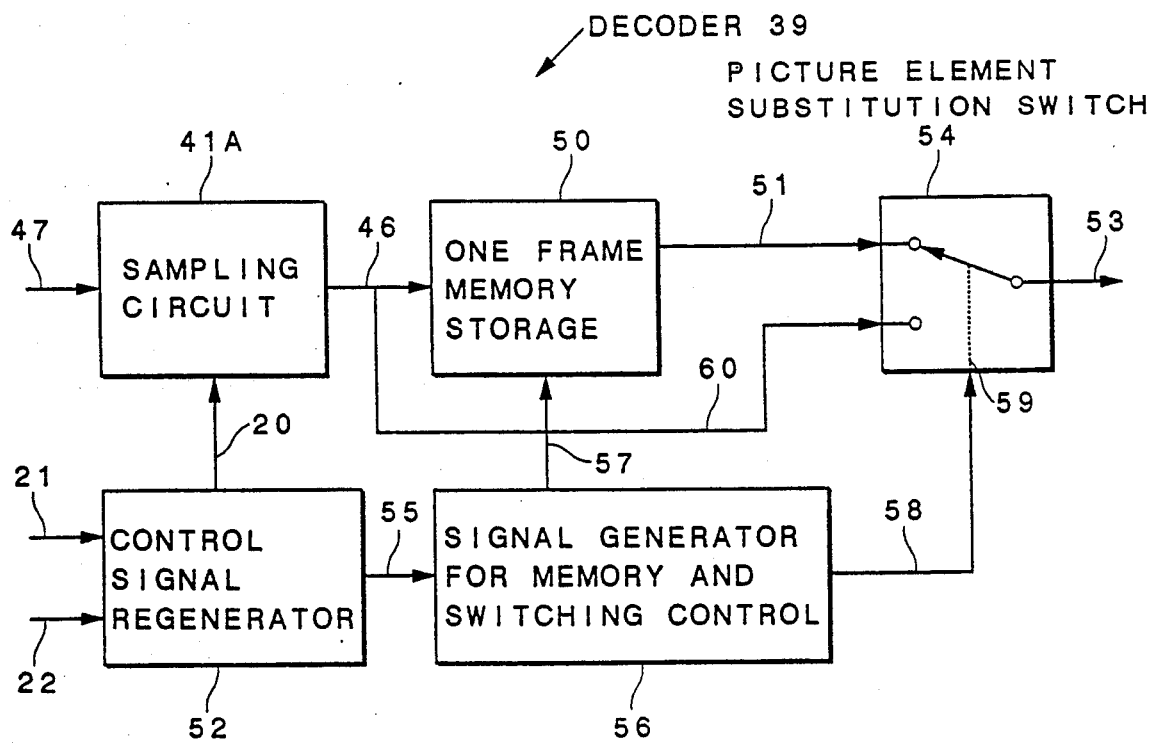
FIG. 3 is a functional block diagram of a decoder embodying this invention for inclusion in a TV receiver for recovering the High Resolution components in the luminance signal from the transmitted ASL-coded signal. This arrangement of FIG. 3 involves only one picture frame of storage capability.

De-Coder For Providing TV Picture Having Twice-Standard Resolution In The Scanning Direction In order to provide a high resolution TV picture which displays the smaller HR picture elements 14, 15, 26 and 27, a decoder 39 (FIG. 3) is provided to recover these smaller picture elements from the ASL-coded luminance signal. An example of such a decoder 39 is shown in FIG. 3. A phase locked loop PLL timing pulse regenerator circuit 52 regenerates the ASL sampling control signal 20 from the conventional horizontal sync signal 22 in the same way as it is generated by the PLL circuit 44 in the encoder 38. The phase of the sampling pulse signal 20 being generated by this generator circuit 52 is locked by the ASL decoder sync (reference) signal 21. By control of this ASL sampling control signal 20, a sampling circuit 41A serves to extract the HR picture element information from the ASL-coded luminance signal 47 (FIG. 3). Thus, HR picture elements labeled with 'A' are sampled by the sampling circuit 41A during Frame "A", while picture elements labeled with 'B' are sampled during Frame "B" from the incoming ASL-coded signal 47.

Opposite to the action in the encoder 38 (FIG. 2) where the duration of each signal sample in the sampling signal 46 is extended in time by the timing compensation circuit 43 so as to lower the frequency in the luminance signal 47, here in this decoder 39 the samples are compressed in time to raise the frequency.

It is to be understood that the ASL-coded luminance signal 47 incoming to the decoder 39 in the TV receiver has already passed through conventional NTSC-standard communication equipment, for example such as one or more of, but not limited to: ground-based broadcasting equipment, satellite-based broadcasting equipment, VCR tape recording equipment. Moreover, this incoming ASL-coded luminance signal 47 in the decoder will have been separated from the chroma signal by conventional chroma/luminance separation circuitry, for example such as a conventional comb filter.

Turning back briefly to FIG. 2 for a summarizing review, the HR picture elements which normally are too small to pass through the standard video bandwidth directly are being sampled and are time-extended in the encoder 38 to become equivalent to bigger picture elements in the ASL coded luminance signal 47 and therefore can pass through the standard video bandwidth and consequently can be available for utilization by the decoder 39. Consequently, the information for creating a High Resolution picture containing the H picture elements is available in the ASL-coded Luminance signal 47 (FIG. 3) being fed into the decoder 39 and being sampled by the sampling circuit 41A.

From the sampling circuit 41A the resulting signal samples at 46 then are transferred to a one-frame memory delay line 50. For example this one-frame memory delay line may comprise solid state FIFO over-writing memory storage. The output 51 from this one-frame memory delay line 50 is switched alternately with the incoming luminance samples 46 on every half-cycle of the sampling control signal 20, (i.e., on the "transition" of the respective P+ and P− pulses) as is shown by signal flow arrows 51 and 60 leading to a picture-element-substitution switch 54, whose switching is controlled as shown by a signal 58 from a control signal generator 56.

In Frame "A" the high resolution luminance output 53 for providing the High Resolution TV picture is taken via switch 54 (as shown by signal path 60) directly from incoming samples 46 during HR picture element 'A' periods, and during HR picture element 'B' periods the output 53 for providing the High Resolution TV picture is taken via switch 54 (as shown by signal path 51) from the one-frame delay line output samples of HR picture elements arising from the preceding Frame "B" obtained during HR picture element 'B' period.

In other words, during each Frame "A" period in the high resolution luminance signal 53 for creating a new High Resolution TV picture frame, all of the 'A'-labelled HR picture elements are being obtained directly (via signal path 60 and switch 54) from the incoming samples 46, and all of the 'B'-labelled HR picture elements are being obtained from the output 51 of the one-frame delay storage (memory) circuit 50 (via switch 54). Thus, these 'B'-labelled HR picture elements are being derived from the preceding Frame "B" which has been temporarily stored in the one-frame delay (memory) storage circuit 50.

Conversely, during each Frame "B" period in the high resolution luminance signal 53 for creating the next ne High Resolution TV picture frame, all of the 'B'-labelled HR picture elements are being obtained directly from the incoming samples 46, and all of the 'A'-labelled HR picture elements are being obtained from the output 51 of the one-frame delay circuit 50. Thus, these 'A'-labelled HR picture elements are being derived from the preceding Frame "A" which has been temporarily stored in the one-frame circuit 50 (FIG. 3).

And thus, these new High Resolution picture frames are created from the output signal 53, with one-half of each such new HR picture frame comprising currently incoming HR picture element information and the other one-half comprising H picture element information coming from the previously received and stored data for Frame "A" or "B", respectively.

Since the decoder output luminance signal 53 is switched between the incoming luminance samples 46 and one-frame memory delay line output 51 on each and every half-cycle of the sampling control signal 20, i.e., is switched on each and every "transition" of the P+ and P— pulses in this sampling control signal 20, there are exactly two samples (equivalent to two HR picture elements) in the decoder output luminance signal 53 during each full cycle of the sampling control signal 20, therefore the maximum fundamental frequency contained in the output signal 53 is equal to the fundamental frequency of the sampling control signal 20, as stated earlier above.

There is a timing signal 57 supplied to the one-frame storage circuit 50. This timing signal 57 is provided by a control signal generator 56 which controls the one-frame storage circuit 50 and thus serves to control the output 51 and also controls the switch 54, as shown by the arrow 58 and dashed line 59 The output signal at 51 contains HR picture elements labeled 'A' from Frame "A" and then HR picture elements labeled 'B' from Frame "B". The resulting high resolution luminance signal 53 reproduces a High Resolution TV picture image 37 (FIG. 1H) which is the same as the original image on scan line portion 10. The small HR picture elements 14, 15 advantageously have been recovered to provide effectively twice standard resolution in the horizontal scanning direction as compared with conventional (NTSC-standard) color TV today.

Optional Fast-Motion-Image Compensation

Figure 4:
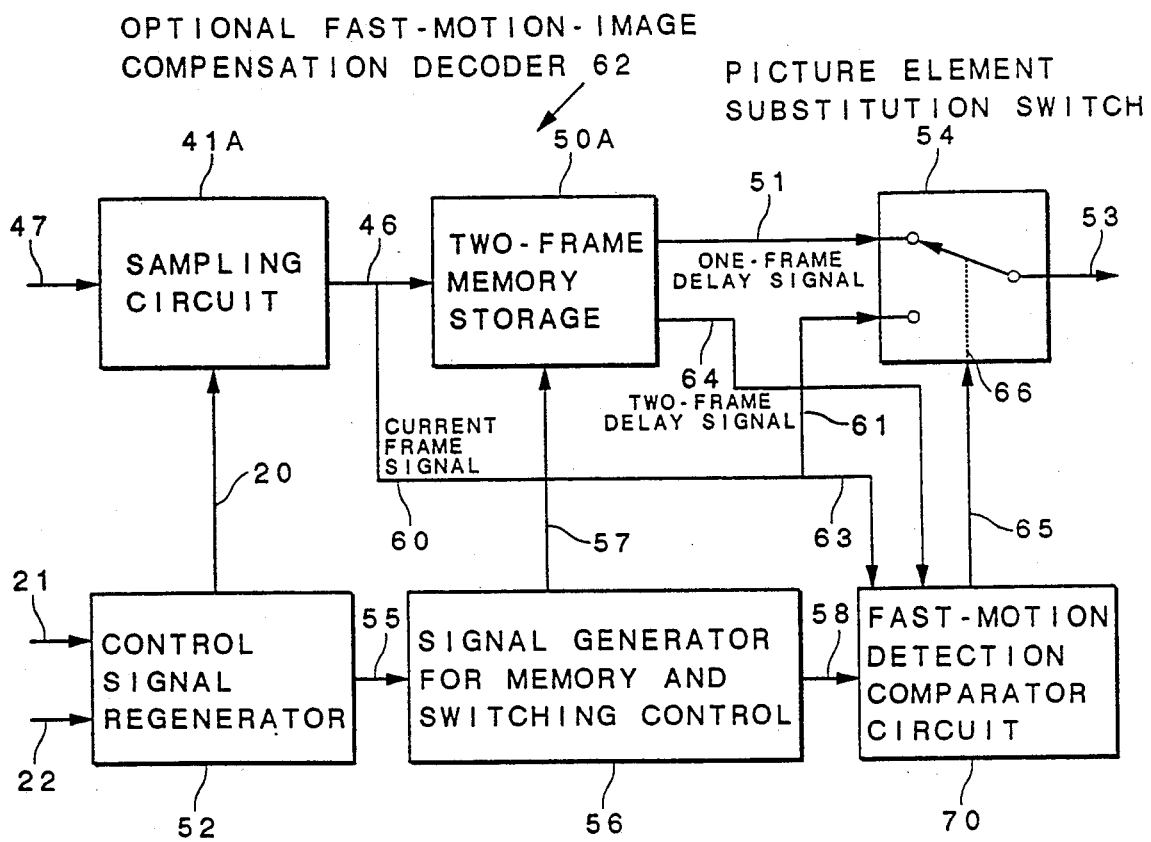
FIG. 4 is the functional block diagram of an alternative decoder embodying this invention for inclusion in a TV receiver for recovering the High Resolution components in the luminance signal from the transmitted ASL-coded signal and including an optional fast-motion-image compensation circuit arrangement.

A decoder with optional fast-motion-image compensation may be provided as shown in FIG. 4. In this fast-motion-image compensation decoder 62 (FIG. 4) there are two signal outputs 51 and 64 from the frame storage delay line 50A which has the capacity to store data for two successive Frames "A" and "B" or "B" and "A", respectively. The output 51 is the luminance signal samples being delayed for exactly one frame time to provide the previous alternate frame HR picture element signal to form the HR luminance signal output 53 through the switch 54. Another output 64 is the luminance signal sample being delayed by exactly two frame times and thus is the sam alternate frame as the frame being currently transmitted via signal path 60 and 63. In other words, since Frame "A" and Frame "B" are being transmitted alternately, and output 64 is being delayed for exactly two frame times, during Frame "A" incoming period the output 64 provides the previous Frame "A" signal. Conversely, during Frame "B" incoming period, the output 64 provides the previous Frame "B" signal.

A motion detection comparator circuit 70 compares the current incoming signal samples 46 via signal path 60, 63 with signal samples from the previous corresponding Frame "A" or "B", as the case may be, available from output 64 of the two-frame storage delay line 50A This comparison being made by the comparator 70 occurs one picture element by one picture element. If a significant difference exists, then the normal switch control signal 58, which normally is conducted by the comparator 70 directly to the picture element substitution switch 54 (which also may be called the "A" and "B" Frame switch), will be intercepted by this motion detector comparator circuit 70, as shown by the control signal 65 and the dashed line 66. Consequently, instead of taking the HR picture element signal from the alternate frame from output 51, the output 53 will be switched to the current input signals 46 through the signal path 60 and 61 so as to provide quicker response of the TV picture to a fast-motion image of a moving object in the picture. Therefore, in such portions of the picture which depict a rapidly moving image, only the most current picture element information is used, and since the incoming frame signal 46 only contains picture elements of a time duration no smaller than the NTSC-standard size, the result is that the resolution in such portions derived from current picture element information remains as "standard". However, due to the fact that human eye cannot see a clear image of a rapidly moving object, and the human eye is more sensitive to the relatively stationary portions of the picture where th picture provided by this invention is effectively twice-standard resolution, the over-all picture as seen by the viewer effectively will have twice-standard resolution or clearness.

Checkered Scan-Line Patterns Of FIGS. 1A Through 1H Are Illustrative For Purposes Of Explanation It is to be understood that the checkered scanning line patterns shown in FIGS. 1A and 1E through 1H are shown for purpose of explanation, being a "classic" type of pattern used for explanation. This checkered pattern is used for convenience and for clarity of explanation and for ease of understanding. In actuality the viewable TV picture may not have picture elements with square-cornered (checkered) configurations nor with abrupt transition lines from full dark to full bright, but nevertheless the benefits of the present invention as explained are obtained in providing substantially twice-standard resolution in th scanning direction.

Alternate Embodiment Of Decoder

Figure 5:
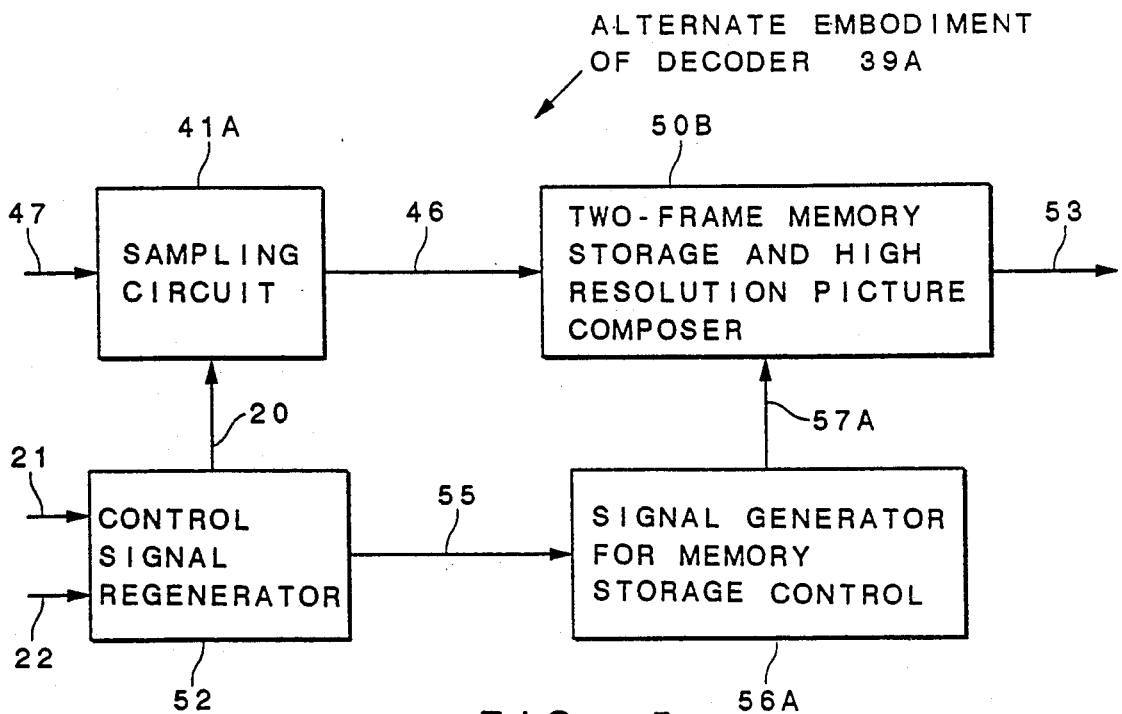
FIG. 5 is a functional block diagram of an alternate embodiment of the decoder of FIG. 3.

In FIG. 5 is shown an alternate embodiment 39A of the decoder 39 of FIG. 3. The memory storage unit 50B has the capacity for storing the data acquired from two successive whole Frames "A" and "B". During Frame period "A" all of the incoming luminance sample data 46 are stored (or over-written) into the 'A' (first) location in each picture element group of a new High Resolution picture whose luminance scanning data is being stored in this memory unit 50B. During Frame period "B" all of the incoming luminance sample data 46 are stored (or over-written) into the 'B' (second) location in each picture element group of the new High Resolution picture whose data is being stored in this memory unit 50B. Thus, the new High Resolution picture is being composed in the memory unit 50B.

The phase locked loop timing pulse (PLL) generator 52 provides a control signal 55 to a control signal generator 56A which feeds control signals 57A for controlling the storage in High Resolution picture-composing memory unit 50B.

Sequential retrieval of data regarding the picture which has been composed in the memory unit 50B provides the High Resolution luminance output signal 53 for displaying the ne High Resolution picture on the screen of a TV receiver set serviced by this decoder 39A. In summary, the new HR picture which has been composed in the memory unit 50B is transferred to a TV screen via the output signal 53.

It is to be noted that the memory unit 50B requires a random access input including an analog-to-digital (A/D) converter in its input and requires a digital-to-analog (D/A) converter in providing its output 53. The control signal 57A causes the "A" Frame data and the "B" Frame data to be inserted alternately into the random access memory, because all of the "A" Frame data is being inserted into the 'A' (first) location in each picture element group of the new High Resolution picture being composed, while the "B" Frame data becomes inserted into the 'B' (second) location in each picture element group. These 'A', 'B', 'A', 'B', 'A', etc. locations alternate with each other in the HR TV color picture scan line, and the output signal 53 provides these HR picture elements in this 'A', 'B', 'A', 'B', 'A', etc. sequence for showing the High Resolution picture on a TV screen which is capable of showing such a High Resolution picture.

An advantage of the decoder switching method of FIGS. 3 and 4 is that the control signal 57 causes the memory data to be fed sequentially into the memory 50 or 50A, in distinction to the random access input required by the High Resolution picture-composing memory unit 50B. Thus, a FIFO-type storage can be used for the memory unit 50 or 50A, for example such as a charge coupled device (CCD), which is an analog-type device and does not require A/D and D/A conversions in the input and output, respectively.

In summary, the decoder 39A of FIG. 5 looks simpler than the decoder 39 of FIG. 3 (and also looks simpler than the decoder 62 of FIG. 4) but the FIG. 5 embodiment is more expensive at the current state of the art of memory storage technology, since random access is needed into the memory unit 50B, and A/D and D/A conversions are needed in addition to random access.

Examples Of Suitable Electronic Components

The sampling circuits 41 and 41A used in the encoder 38 and decoder 39, 62 or 39A respectively, can be either an analog or a digital circuit. Their switching time (aperture time) must be suitable for the selected sampling frequency of the sampling control signal 20 (FIG. 1B).

Such an analog sampling circuit 41 or 41A can be an electronic analog switch with turn-on and turn-off response times sufficiently short to be responsive to the control pulses P+ and P− and having a low on-state resistance (and a high off-state resistance) in series with the on-state conduction path, and having also a low off-state shunt capacitance. Commercially available analog components, for example such as an FET transistor, a diode bridge or an integrated circuit such as 74HC4066 manufactured by National Semiconductor Corporation, Santa Clara, Calif., satisfies the requirements for sampling in the video frequency range.

Such a digital sampling circuit 41 or 41A can employ a video analog-to-digital (A/D) converter, for example such as KSV3100A manufactured by Samsung Semiconductor of Santa Clara, Calif., which provides an A/D converter and a digital-to-analog (D/A) converter with a converting rate up to 38.5 million samples per second in a monolithic design.

The timing compensation circuit 43 compensates for the time duration difference between the period of 'A' and the period of 'B' HR picture elements, such as 14, 15, 26, and 27 (FIG. 1A), and the period for standard-sized picture elements, such as 13, 23, 24 and 25 (FIG. 1A). In this timing compensation circuit 43, the video voltage sampled for a particular HR picture element is held so as to extend for the period of a whole group of two successive HR picture elements, which is then equal to the standard sampling period 13' or 16' (FIG. 1A). Such a timing compensation circuit 43 may be of either analog or digital functioning. For example, a suitable analog arrangement for this compensation circuit 43 can be a voltage-holding capacitor followed by a low-input-leakage video follower. An example of a suitable digital arrangement for this compensation circuit 43 is a multi-bit digital register for holding the signal information in digital form. Moreover, a sample and hold circuit also can be used for the timing compensation circuit 43.

It is to be remembered that the 'A' HR picture element sample signals in Frame "A" are shifted in time (are earlier in time) by one HR picture element scanning period relative to the 'B' HR picture element sample signals in Frame "B". This HR picture element sample timing difference can be compensated by delaying the video output from Frame "A" by one-half of the sampling cycle period in a video delay line included in the compensation circuit 43.

The phase locked loop (PLL) timing pulse generator circuit 44 or 52 generates or regenerates the sampling pulse control signal 20 in the encoder 38 or decoder 39, 62 or 39A, respectively. This PLL timing pulse generator 44 or 52 multiplies the conventional sweep scanning frequency (sweep sync frequency) of the signal 22 (FIG. 1D) by a predetermined amount in the preferred range from 364 times to 532 times (depending upon the available VCR or TV bandwidth) in order to derive the fundamental frequency of the ASL sampling control signal 20, which is to be equal (as explained above) to an even harmonic of the frequency of the sweep scanning sync signal 22. Such PLL circuit 44 or 52 also generates a timing compensation control signal supplied at 45 (FIG. 2) to control the timing compensation circuit 43 and a reference signal 55 supplied (FIGS. 3, 4 and 5) for controlling the control signal generator 56 or 56A.

Keeping in mind that the decoder sync signal 21 (FIG. 1C), also called the ASL sync signal or the ASL reference signal, is transmitted during the blanking period immediately preceding field one of Frame "A", it will be appreciated that this decoder sync signal 21 is only available once for every two Frames "A" and "B". Therefore, in order to ensure phase stability in the regenerated ASL sampling control signal 20 in the decoder 39 or 62 or 39A, it is preferred that a voltage controlled oscillator which is used in the PLL timing pulse generator 44 and regenerator 52 be a temperature-compensated circuit or be crystal tuned for stability. For constructing a phase locked loop generator circuit 44 or a regenerator circuit 52, there are commercially available integrated circuits and building blocks, for example such as NE564 manufactured by Signetics Corporation of Sunnyvale, Calif., which can be combined with widely used TTL frequency dividers for deriving the desired even harmonic of the scanning sweep frequency signal 22 for providing the fundamental frequency of the ASL sampling control signal 20.

The one-Frame storage circuit 50 in the decoder 39 stores the sample data 46 from the ASL-coded luminance signal 47 for one whole picture frame for enabling the decoder 39 to reassemble the High Resolution luminance signal provided at 53 resulting from the information transmitted in two consecutive Frames. Such a one-Frame storage circuit 50 can comprise CCD analog shift registers; or in digital form such a circuit 50 can comprise static or dynamic digital shift registers, or a random access memory arrangement can be used.

The two-frame storage circuit 50A in the decoder 62 of FIG. 4 has the same structure as circuit 50 but has double the amount of storage capacity and has two outputs.

The High Resolution picture-composing storage circuit 50B has been described above, and it includes a random access memory with enough capacity to store the data from two successive whole Frames "A" and "B". This data is continuously updated, because the data for a new High Resolution TV picture presentation is being continuously composed in this circuit 50B. An A/D converter is included for converting the input data 46 for this picture-composing storage circuit 50B and a D/A converter for providing the output signal 53.

The motion detector 70 is optional as described, and it can be a video voltage comparator, either analog or digital. The motion detector 70 preferably has a controlled sensitivity which is predetermined so as to avoid responding to small variations of the luminance signals in successive corresponding Frames (i.e., variations in new Frame "A" versus previous Frame "A" or variations in new Frame "B" versus previous Frame "B"), such small variations might be due to electrical background "noise". This controlled sensitivity is also predetermined so as to avoid responding to small differences in portions of a TV picture wherein relatively slow motion of an image is being depicted.

Scanning Can Be Horizontal Or Vertical, Analog Or Digital

The present invention for providing twice-standard resolution in the scanning direction can be applied (i) regardless of whether the scanning is horizontal or vertical and (ii) regardless of whether the scanning is provided in an analog manner or in a digital manner.

Since other changes and modifications varied to fit particular operating requirements and environments will be understood by those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. The method of encoding a luminance signal portion of a color television motion picture signal for providing capability for substantially twice-standard resolution in at least the scanning direction in a TV picture produced from the encoded luminance signal while being compatible with the current NTSC color TV video format and being compatible with the current NTSC color TV broadcasting bandwidth requirements, and being compatible with existing TV receiver sets, said method comprising the steps of:
   treating the successive picture frames of the color TV motion picture as alternate first and second frames in a sequence;
   treating standard picture elements which are distinguishable in the scanning direction within the available video bandwidth under the current color TV video format as applied to TV broadcasts, VCR applications, video games, as each being divided into a group of two successive high resolution (HR) picture elements of equal size;
   treating a first of the two successive HR picture elements in each group as a first HR picture element;
   treating a second of the two successive HR picture elements in each group as a second HR picture element;
   in generating the encoded video luminance signal for each first frame, sampling only the first HR picture elements;
   using the resulting samples to provide luminance values for both the first and second HR picture elements in the respective groups of the first frame;
   in generating the encoded video luminance signal for each second frame, sampling only the second HR picture elements, and
   using the resulting samples to provide luminance values for both the first and second HR picture elements in the respective groups of the second frame.

2. The method as claimed in claim 1, including the further decoding steps of:
   creating a High Resolution luminance signal from the encoded video luminance signal which has been encoded by the steps of claim 1 by:
   sampling the encoded video luminance signal for two successive frames for retrieving luminance values for the first HR picture elements in a first of the two successive frames and for retrieving the luminance values for the second HR picture elements in a second of the two successive frames; and
   alternating the luminance values of the first and second HR picture elements for creating said High Resolution luminance signal for providing a new High Resolution picture frame.

3. The method as claimed in claim 2, including the further step of:
   providing a TV picture having High Resolution in the scanning direction by producing scan lines in which the luminance values along each scan line are in accord with said High Resolution luminance signal.

4. The method as claimed in claim 2, including the further step of:
   providing a high Resolution TV scene by producing scan lines in each of which:
   the first and second HR picture elements are alternated with each other.

5. The method of encoding a luminance signal portion of a color television motion picture signal comprising the steps of:
   treating the successive picture frames of the color TV motion picture as alternate first and second frames in a sequence;
   dividing standard picture elements which are distinguishable in the scanning direction within the available video bandwidth under the current color TV video format applied to TV broadcasts, VCR applications, and video games, into first and second HR picture elements in each first frame by sampling a luminance value of each such standard picture element during a first half of each such standard picture element in the scanning direction during each first frame;
   dividing each such standard picture element into first and second HR picture elements in each second frame by sampling a luminance value of each such standard picture element during a second half of each such standard picture element in the scanning direction during each second frame;
   in generating the encoded video luminance signal for each first frame using the resulting samples to provide luminance values for both the first and second HR picture elements in the respective groups of first frames;
   in generating the encoded video luminance signal for each second frame using the resulting samples to provide luminance values for both the first and second HR picture elements in the respective groups of second frames.

6. The method as claimed in claim 5, in which:

the luminance values of such standard picture elements in the scanning direction are sampled during each sampled and second frame at a frequency equal to an even harmonic of the frequency of occurrence of scanning sweeps in the scanning direction, called the "sweep frequency".

7. The method of claim 6, in which:
said frequency is twice the value of about the highest harmonic of the sweep frequency permitted by the current conventionally available video bandwidth.

8. The method of claim 7, in which:
said even harmonic is the 364th harmonic of the sweep frequency for fitting within the conventionally available bandwidth of a video cassette recorder (VCR).

9. The method of claim 7, in which:
said even harmonic is the 532nd harmonic of the sweep frequency for fitting within the conventionally available NTSC video bandwidth.

10. The method of claim 8, including the further steps of:
second sampling an encoded luminance signal which has been encoded by said first sampling at a frequency equal to the 364th harmonic of the sweep frequency by second sampling said encoded signal at said frequency equal to the 364th harmonic of the sweep frequency for two successive frames for retrieving luminance values for the first HR picture elements in a first of the two successive frames and for retrieving luminance values for the second HR picture elements in a second of the two successive frames; and
alternating the luminance values of the first and second HR picture elements for creating a High Resolution luminance signal for providing a High Resolution TV picture from a video cassette recorder.

11. The method of claim 9, including the further steps of:
second sampling an encoded luminance signal which has been encoded by said first sampling at a frequency equal to the 532nd harmonic of the sweep frequency by second sampling said encoded signal at said frequency equal to the 532nd harmonic of the sweep frequency for two successive frames for retrieving luminance values for the first HR picture elements in a first of two successive frames and for retrieving luminance values for the second HR picture elements in a second of two successive frames; and
alternating the luminance values of the first and second HR picture elements for creating a High Resolution luminance signal for providing a TV picture.

12. The method as claimed in claim 1, including the steps of:
generating the encoded video luminance signal for said first and second frames by sampling said first HR picture elements during each first frame and sampling said second HR picture elements during each second frame at a frequency of sampling equal to a predetermined even harmonic of the scanning sweep frequency twice the value of about the highest harmonic thereof compatible with current color TV broadcasting bandwidth requirements;
generating in a TV receiver said predetermined even harmonic of the scanning sweep frequency;
sampling the encoded video luminance signal in the TV receiver at a frequency of sampling equal to said predetermined even harmonic of the scanning sweep frequency for retrieving in the TV receiver luminance values for said first and second HR picture elements; and
creating a High Resolution luminance signal in the TV receiver by alternating the luminance values for said first and second HR picture elements.

13. The method of claim 12, wherein:
said frequency of sampling is equal to the 532nd harmonic of the scanning sweep frequency; and
the luminance values for the alternating first and second HR picture elements occur in said High Resolution luminance signal at a rate equal to the 532nd harmonic of the scanning sweep frequency.

14. The method of claim 12, wherein:
said frequency of sampling is equal to the 364th harmonic of the scanning sweep frequency;
the luminance values for the alternating first and second HR picture elements occur in said High Resolution luminance signal at a rate equal to the 364th harmonic of the scanning sweep frequency.

15. The method of claim 12, including the further steps of:
generating a decoder synchronizing signal having a sync frequency equal exactly to one-half of the frequency of sampling;
said decoder synchronizing signal having a predetermined phase relationship with respect to the sampling of said first HR picture elements during each first frame
transmitting said decoder synchronizing signal during each blanking period preceding each first frame.

16. The method of claim 15, including the further step of:
using said decoder synchronizing signal in the TV receiver for synchronizing the sampling in the TV receiver.

17. The method of claim 12, including the step of:
generating a sampling control signal having a fundamental frequency equal to said predetermined even harmonic;
said sampling control signal having a generally square-wave configuration of amplitude versus time including positive-going transitions and negative-going transitions; and
using successive pulses of a same polarity for controlling said sampling of said first HR picture elements during each first frame; and
using successive pulses of said same polarity for controlling said sampling of said second HR picture elements during each second frame for causing the second HR picture element of each group of picture elements to be sampled during each second frame.

18. A method of increasing the resolution capability of a color TV system while being compatible with current bandwidth standards for color TV, and compatible with existing TV broadcasting equipment and existing TV receivers comprising the steps of:
providing sampling intervals uniformly spaced in time;
each such sampling interval having the same time duration and each time space between successive sampling intervals having said same time duration;
the frequency of occurrence of said sampling intervals being twice the value of about the highest harmonic of scanning sweep frequency compatible with current video bandwidth standards for color TV;

treating successive picture frames as alternating first and second picture Frames;

during each first picture Frame sampling luminance values of a conventional color TV luminance signal at each said sampling interval;

during each second picture Frame sampling luminance values of the conventional color TV luminance signal at each said time space between the successive sampling intervals;

providing an encoded luminance signal from each said first picture Frame in accordance with successive luminance values obtained during each first picture Frame by sampling at each said sampling interval; and providing an encoded luminance signal encoded from each said second picture Frame in accordance with successive luminance values obtained during each said second picture Frame by sampling at each said time space between the successive sampling intervals.

19. The method as claimed in claim 18, including the further steps of:

creating a High Resolution luminance signal in a TV receiver by the steps of:

retrieving successive luminance values of the encoded luminance signal;

alternating the successive luminance values retrieved from said encoded luminance signal encoded from each picture Frame with the successive luminance values retrieved from said encoded luminance signal encoded from the succeeding picture Frame, thereby providing the High Resolution luminance signal with twice as many luminance values per unit time as the occurrence of luminance values per unit time in said encoded luminance signal.

20. The method of claim 19, including the steps of:

using the High Resolution luminance signal for controlling the luminance of successive HR picture elements in a picture on a screen of a color TV receiver in accordance with said luminance values in said High Resolution luminance signal;

said color TV receiver having a scanning direction; and resolution in said picture in said scanning direction being twice a resolution which would have occurred by using said encoded luminance signal.

21. The method as claimed in claim 18, in which:

the frequency of occurrence of said sampling intervals is equal to the frequency of an even harmonic of a scanning sweep frequency employed in providing said conventional color TV luminance signal.

22. The method as claimed in claim 21, in which:

said even harmonic is the 532nd harmonic of the scanning sweep frequency.

23. The method as claimed in claim 18, in which:

said encoded luminance signal is compatible with conventional video cassette recorders; and the frequency of occurrence of said sampling intervals is equal to the frequency of the 364th harmonic of a conventional color TV scanning sweep frequency.

24. An Alternate Sampled Luminance (ASL) method of encoding and decoding the luminance signal portion of color TV motion picture applications for enabling substantially twice-standard resolution in the scanning direction to be provided in presentation of such picture on a TV receiver screen, said ASL method being compatible with current NTSC color TV format bandwidth limitations at least for one of such applications and being compatible with existing TV receiver sets, said ASL method comprising the steps of:

sampling at predetermined moments in time the luminance values of a luminance signal resulting from scanning sweeps of a first Frame of such picture;

said moments each being of a same length in time;

alternate predetermined moments alternating in time with said moments and also each being of said same length in time;

said sampling having a time rate corresponding with a frequency substantially at twice the upper limit of current NTSC color TV format bandwidth limitations for said one such application;

sampling the luminance values of a luminance signal resulting from scanning sweeps of a second Frame of such picture;

said second Frame immediately following said first Frame;

said sampling of the luminance values of the luminance signal resulting from scanning sweeps of the second Frame occurring in timing relative to scanning sweeps of the second Frame at the timing of said alternate predetermined moments relative to scanning sweeps of the first Frame;

at a TV receiver temporarily storing at least luminance information for said first Frame corresponding to said sampling at the timing of said predetermined moments;

retrieving at the TV receiver luminance information for said second Frame corresponding to said sampling at th timing of said alternate predetermined moments; and generating a High Resolution luminance signal at the TV receiver by using in alternating sequence said luminance information for said First Frame and said luminance information for said second Frame;

thereby providing a High Resolution luminance signal for enabling substantially twice-standard resolution in the scanning direction in presentation of a new High Resolution frame of such picture on a TV receiver screen.

25. The Alternate Sampled Luminance method of claim 24, including the steps of:

sampling the luminance values of a luminance signal resulting from scanning sweeps of a third Frame of such picture;

said third Frame immediately following said second Frame;

said sampling of the luminance values of the luminance signal resulting from scanning sweeps of the third Frame occurring in timing relative to the scanning sweep of the third Frame at the timing of said predetermined moments relative to scanning sweeps of the first Frame;

at the TV receiver temporarily storing luminance information for said second Frame corresponding to said sampling at the timing of said alternate predetermined moments;

retrieving at the TV receiver luminance information for said third Frame corresponding to said sampling at the timing of said predetermined moments; and continuing generating said High Resolution luminance signal at the TV receiver by using in alternating sequence said luminance information for said second Frame and said luminance information for said third Frame;

thereby continuing the High Resolution luminance signal for enabling substantially twice-standard resolution in the scanning direction in presentation of a new High Resolution second frame of such picture on the TV receiver screen.

26. The Alternate Sampled Luminance method of claim 24, including the further steps of:

at the TV receiver also temporarily storing luminance information for said second Frame corresponding to said sampling at the timing of said alternate predetermined moments; and generating said High Resolution luminance signal by sequentially removing from storage luminance information for said first Frame alternating with luminance information for said second Frame.

27. The Alternate Sampled Luminance method of claim 25, including the further steps of:

at the TV receiver also temporarily storing luminance information for said third Frame corresponding to said sampling at the timing of said predetermined moments; and continuing generating said High resolution luminance signal by sequentially removing from storage luminance information for said second Frame alternating with luminance information for said third Frame.

28. The Alternate Sampled Luminance method of claim 24, wherein:

said scanning sweeps of the Frames of such picture are occurring at a scanning sweep frequency; and said sampling having a time rate corresponding with a frequency which is equal to an even harmonic of the scanning sweep frequency.

29. The Alternate Sampled Luminance method of claim 28, wherein:

said even harmonic is the 532nd harmonic of the scanning sweep frequency.

30. The Alternate Sampled Luminance method of claim 27, including the further steps of:

comparing said luminance information for said third Frame with said stored luminance information for said first Frame;

in generating said High Resolution luminance signal substituting for portions of said luminance information for said second Frame luminance information for said third Frame; and causing said substituting to occur in regions of such picture where there are substantial differences between said luminance information for said third Frame as compared with luminance information for said first Frame, said substantial differences resulting from such regions of such picture depicting relatively fast motion of a image.

31. Apparatus for encoding a luminance signal portion of a color television motion picture signal for providing capability for substantially twice-standard resolution in at least the scanning direction in a TV picture produced from the encoded luminance signal while being compatible with the current NTSC color TV video format and being compatible with the current NTSC color TV broadcasting bandwidth requirements, and being compatible with existing TV receiver sets, said apparatus comprising:

control signal generator means;

sampling circuit means coupled to said control signal generator means and being responsive thereto for sampling the luminance signal portion of a color television motion picture signal, said sampling circuit means treating the successive picture frames of the color TV motion picture as alternate first and second frames in a sequence;

said sampling circuit means as controlled by said control signal generator means also treating standard picture elements which are distinguishable in the scanning direction within the available video bandwidth under the current NTSC color TV video format as applied to TV broadcast applications, VCR applications, video game applications, as each being divided into a group of two successive high resolution (HR) picture elements of equal size;

said sampling circuit means as controlled by said control signal generator means also treating a first of the two successive HR picture elements in each group as a first HR picture element and treating a second of the two successive HR picture elements in each group as a second HR picture element;

said sampling circuit means in generating the encoded video luminance signal for each first frame, sampling only the first HR picture elements for providing a sampling output signal for each first frame;

time duration compensation means coupled to said sampling circuit means extending time duration of sample signals resulting from sampling said first HR picture element to twice such time duration for becoming comparable to time duration of standard picture elements, said sampling circuit means in generating the encoded video luminance signal for each second frame, sampling only the second HR picture element for providing a sampling output signal for each second frame; and said time duration compensation means also extending time duration of sample signals resulting from sampling said second HR picture elements to twice such time duration for becoming comparable to time duration of standard picture elements, whereby an encoded luminance signal produced by said apparatus is capable of providing substantially twice-standard resolution in at least the scanning direction while being compatible with the NTSC format applicable to a predetermined one of said applications.

32. Apparatus as recited in claim 31, wherein:

said control signal generator means produces a control signal having a fundamental frequency equal to an even harmonic of the frequency of occurrence of scanning sweeps in the scanning direction, called the "sweep frequency".

33. Apparatus as recited in claim 32, wherein:

said fundamental frequency is twice the value of about the highest harmonic of the sweep frequency permissible for said predetermined application.

34. Apparatus as recited in claim 33, wherein:

said even harmonic is twice the 266th harmonic of the sweep frequency for a TV broadcast application and thereby said fundamental frequency of said control signal is equal to the frequency of the 532nd harmonic of the sweep frequency.

35. Apparatus as recited in claim 33, wherein:

a predetermined even harmonic of the sweep frequency is selected for a color TV broadcast application from the range of even harmonics including the 532nd, 530th, 528th, 526th, 524th, 522nd, 520th, 518th and 516th harmonic of the sweep frequency.

36. Apparatus as recited in claim 33, wherein:
said even harmonic is twice the 182nd harmonic of the sweep frequency for a VCR application, and thereby said fundamental frequency of the control signal is equal to the frequency of the 364th harmonic of the sweep frequency.

37. Apparatus as recited in claim 33, wherein:
said fundamental frequency is equal to predetermined even harmonic of the sweep frequency selected for a VCR application from the range of even harmonics including the 364th, 362nd, 360th, 358th, 356th, 354th, 352nd, 350th and 348th harmonic of the sweep frequency.

38. Apparatus for encoding a luminance signal of a color television motion picture signal, wherein said luminance signal corresponds with successive frames of a color television motion picture and said luminance signal includes standard-picture-element signals which are distinguishable in a scanning direction within available video bandwidth for a predetermined application selected from the group of applications comprising TV color broadcasts, VCR presentations and video games, said apparatus comprising:
signal sampling means for sampling a luminance signal and having an input for receiving the luminance signal ad having an output for providing a sampling signal resulting from sampling the luminance signal;
control means coupled to said signal sampling means for controlling the sampling of said luminance signal;
time-duration compensating means for doubling the time duration of sample signals in said sampling signal;
said control means causing said signal sampling means to sample first halves of standard-picture-element signals for providing first signal samples during a first frame of the color television motion picture and to sample second halves of standard-picture-element signals for providing second signal samples during a second frame of the color television motion picture; and
said time-duration compensating means doubling the time duration of the respective first and second signal samples for becoming comparable in time duration to the standard-picture-element signals.

39. Apparatus as recited in claim 38, further comprising:
timing-difference compensating means for equalizing timing of said second signal samples relative to scanning lines in a second frame of said color television motion picture with timing of said first signal samples relative to scanning lines in a first frame of said color television motion picture.

40. Apparatus as recited in claim 39, further comprising:
synchronizing signal during predetermined blanking periods between successive frames of the color television motion picture.

41. Apparatus for decoding an encoded luminance signal of a color television motion picture, said apparatus comprising
signal sampling means for sampling an encoded luminance signal and having an input for receiving the encoded luminance signal and having an output for providing a decoder sampling signal resulting from sampling the encoded luminance signal;
luminance data storage means coupled to said output for storing luminance data in said decoder sampling signal;
said luminance data storage means having an output and having sufficient storage for storing luminance data applicable to at least one frame of the color television motion picture;
control signal generator means coupled to said signal sampling means for controlling said signal sampling means;
said control signal generator means being responsive to a scanning sweep sync pulse occurring during a blanking period between frames of the color television motion picture and also being responsive to a decoder synch pulse reference signal occurring during a blanking period between frames of the color television motion picture for generating a control signal having a fundamental frequency equal to an even harmonic of the scanning sweep frequency;
switch means having an output for providing a decoder luminance signal;
said switch means being coupled to said output of said signal sampling means and also being coupled to said output of said luminance data storage means; and
said switch means being controlled in accordance with successive half cycles of said fundamental frequency of said control signal for switching in timed relationship with said half cycles alternately to said output of said signal sampling means and to said output of said luminance data storage means for providing a decoder luminance signal at said output of said switch means having frequency components higher than the highest frequency components of said encoded luminance signal and thereby capable of providing a color television motion picture having higher resolution in the scanning direction than would be produced by employing said encoded luminance signal without said apparatus.

42. Apparatus as recited in claim 41, wherein:
said control signal has a fundamental frequency equal to twice about the highest harmonic of the sweep frequency permissible by available bandwidth under current protocol for color TV broadcasts.

43. Apparatus as recited in claim 42, wherein:
said control signal has a fundamental frequency equal to a predetermined even harmonic of the sweep frequency; and
said predetermined even harmonic is an even harmonic selected from the group of even harmonics consisting of the 532nd, 530th, 528th, 526th, 524th, 522nd, 520th, 518th and 516th.

44. Apparatus as recited in claim 41, wherein:
said control signal has a fundamental frequency equal to twice about the highest harmonic of the sweep frequency permissible by available bandwidth under current practice for VCR applications.

45. Apparatus as recited in claim 44, wherein:
said control signal has a fundamental frequency equal to a predetermined even harmonic of the sweep frequency; and
said predetermined even harmonic is selected from the group of even harmonics consisting of the 364th, 362nd, 360th, 358th, 356th, 354th, 352nd, 350th and 348th.

46. Apparatus for decoding an encoded luminance signal as recited in claim 41, further comprising:
fast-motion-image compensation means associated with said switch means for switching said switch means to said output of said signal sampling means upon the occurrence of sample signals depicting relatively rapid motion of an image.

47. Apparatus as recited in claim 46, wherein:
said luminance data storage means has sufficient storage for storing luminance data applicable to two successive frames of a color television picture;
said luminance data storage means having a first data output relating to a preceding frame and having a second data output relating to a frame immediately prior to said preceding frame;
said fast-motion-image compensation means being coupled to said second output of said luminance data storage means and being coupled to said output of said signal sampling means for comparing sample signals at the output of said signal sampling means with signals at said second output.

48. Apparatus for decoding an encoded luminance signal of a color television motion picture for a predetermined application, said apparatus comprising:
signal sampling means for sampling an encoded luminance signal and having an input for receiving the encoded luminance signal and having an output for providing a decoder sampling signal resulting from sampling the encoded luminance signal;
high-resolution-picture-composing storage means having capability for storing data relating to at least two successive frames of a color television motion picture;
control signal generator means coupled to said signal sampling means for controlling said signal sampling means and coupled to said high-resolution-picture-composing storage means for controlling said high-resolution-picture-composing storage means;
said control signal generator means being responsive to a scanning sweep sync pulse occurring during a blanking period between frames of the color television motion picture and also being responsive to a decoder sync pulse occurring during a blanking period between frames of the color television motion picture for generating a control signal having a fundamental frequency equal to twice the value of about the highest harmonic of scanning sweep frequency permissible within available bandwidth provided in accord with protocol of said predetermined application;
said signal sampling means being responsive to said control signal for sampling first halves of standard-picture-element signals for providing first signal samples during a first frame of the color television motion picture and for sampling second halves of standard-picture-element signals for providing second signal samples during a second frame of the color television motion picture, said second frame being successive to said first frame;
said high-resolution-picture-composing storage means storing first data corresponding to said first signal samples in alternating relationship with second data corresponding to said second signal samples; and
said high-resolution-picture-composing storage means having an output for providing a decoder luminance signal for a single frame of the color television motion picture wherein said first data alternate with said second data for enabling presentation of said single frame having twice standard resolution in a scanning direction.

49. Apparatus for decoding an encoded luminance signal as recited in claim 48, wherein:
said control signal generator means includes phase locked loop means for producing a control signal having a fundamental frequency equal to a predetermined even harmonic of scanning sweep frequency, said predetermined even harmonic being selected from a group consisting of the 532nd, 530th, 528th, 526th, 524th, 522nd, 520th, 518th and 516th.

50. Apparatus as claimed in claim 48, wherein said predetermined application is a video cassette player, in which:
said control signal generator means includes means for producing a control signal having a fundamental frequency equal to a predetermined even harmonic of scanning sweep frequency, said predetermined even harmonic being selected from a group consisting of the 364th, 362nd, 360th, 358th, 356th, 354th, 352nd, 350th and 348th.

* * * * *